Aug. 6, 1968 W. SALVESEN 3,395,629
SUPERIMPOSING PHOTOGRAPHIC DEVICE
Filed May 15, 1964 2 Sheets-Sheet 1

INVENTOR.
WILLIAM SALVESEN

BY Anslow & Thomas

ATTORNEYS.

INVENTOR.
WILLIAM SALVESEN

United States Patent Office 3,395,629
Patented Aug. 6, 1968

3,395,629
SUPERIMPOSING PHOTOGRAPHIC DEVICE
William Salvesen, 1214 71st St.,
Brooklyn, N.Y. 11228
Filed May 15, 1964, Ser. No. 367,711
6 Claims. (Cl. 95—1.1)

The present invention relates to a superimposing photographic device.

In the past it has been found advantageous to be able to make a simultaneous photograph of two different objects superimposed as a unit on the photograph.

One particularly important use has been in the photographing of identification cards showing the person's actual signature and other identification information and the person's picture.

The importance of this lies in the fact that the photograph being an integral part of the card, makes it for all intents and purposes, tamper proof.

Such cards have in the past been produced by complicated devices superimposing images of an actual signed identification card with an actual image of a person on one photographic plate then making a photograph showing both the person's picture and signed identification card as a unit.

In order to do this, complicated optical systems have been required, usually including prisms or reflecting surfaces requiring the image of the person to be reflected around the lens and not being directly focusable on the lens.

According to the present invention a superimposing photographic system is provided wherein the image of an object is focused through a non-opaque portion of a reflective surface and simultaneously superimposed so that a unitary photograph may be taken.

Although such novel feature or features believed to characteristic of the invention are pointed out in the claims, the invention and the manner in which it may be carried out, may be further understood by reference to the description following and the accompanying drawings.

Referring now to the figures in greater detail, where like reference numbers denote like parts in the various figures.

Figure 1:
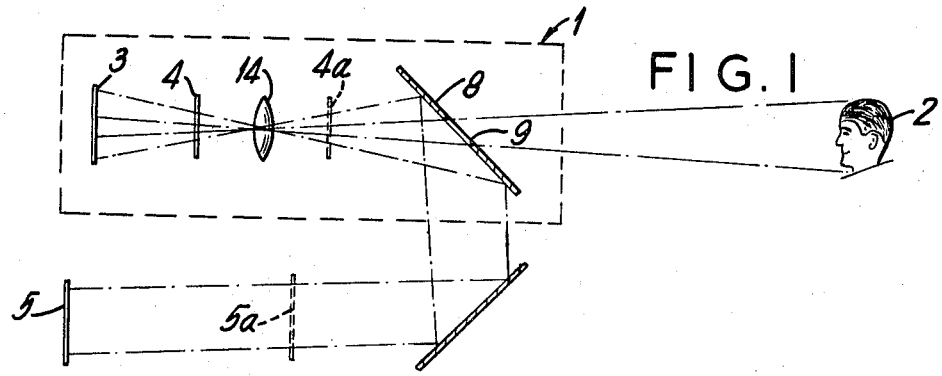
FIG. 1 is a diagrammatic view of an embodiment of the present invention.

In FIG. 1 a superimposing photographic device 1 is shown, superimposing the head 2 of a man on a photographic film 3.

A shutter 4 actually controls the light that falls on the film 3 and when open determines the exposure.

Figure 2:
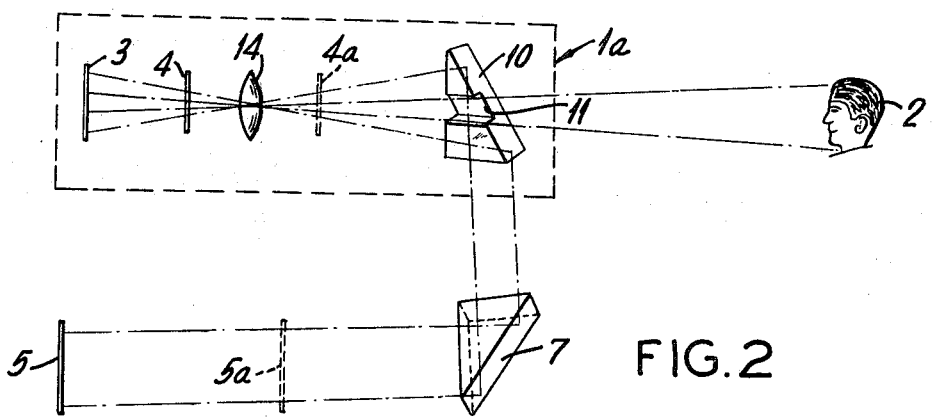
FIG. 2 is a diagrammatic view of another embodiment of the present invention.

Except where specifically stated, the elements shown in FIG. 2 of the superimposing photographic device 1a are the same.

The shutter 4a as shown in phantom in FIGS. 1 and 2 may also be placed in front of the lens instead of in back of the lens.

An identity card 5 or other object is arranged so that it reflects upon a reflecting surface such as a mirror 6 as shown in FIG. 1.

A prism 7 as shown in FIG. 2 may also serve the purpose as a reflecting surface.

The object 5a as shown in phantom in FIGS. 1 and 2 illustrate another position at which the object such as an identity card 5 may be set.

The object 5 is reflected upward to another mirror 8 which reflects the image of the object 5 through the lens. The mirror 8 has an opening 9 through which the image of the head 2 may be viewed. When the shutter 4 is open the object 5 and head 2 may be superimposed on the film 3.

In FIG. 2 a prism 10 has a cutaway 11 allowing free passage of a view of the head 2 to the film 3 when the shutter 4 is open.

Figure 1A:
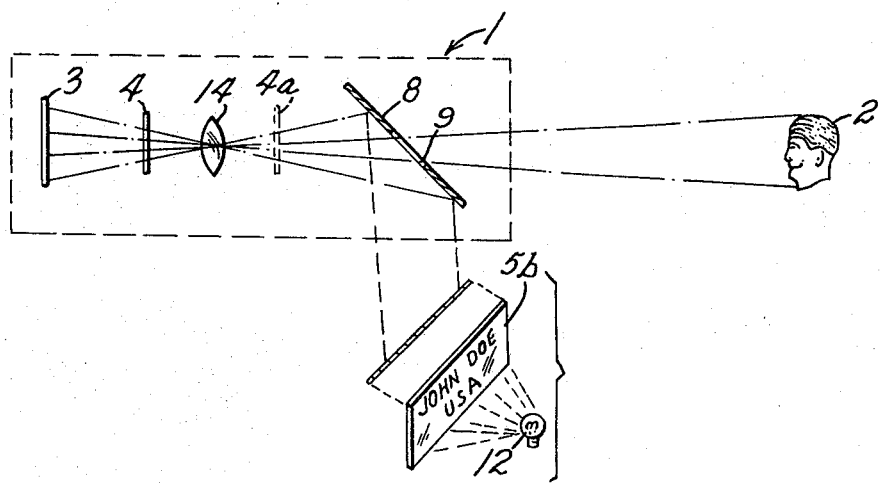
FIG. 1a is a diagrammatic view of another embodiment of the present invention.

The identity card 5b as shown in FIG. 1a may replace the mirror 6 or prism 7. In such case it is usually desirable to have a translucent card 5b so that a front facing image is received by the film 3. It may be advisable to have a light source 12 to effectuate this purpose.

Figure 3:
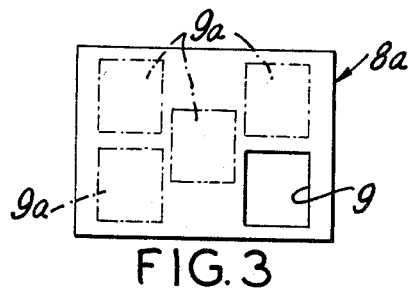
FIG. 3 is a front elevation of a reflector plate useable in the present invention.
Figure 4:
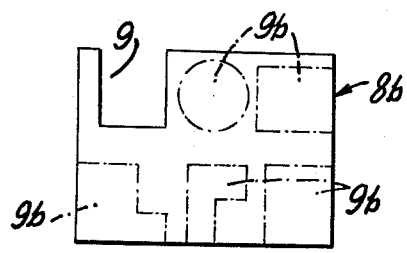
FIG. 4 is a front elevation of another reflector plate useable in the present invention.

In FIGS. 3 and 4 are shown reflector plates 8a, 8b with openings 9 at different locations selected as needed. In FIGS. 3 and 4 illustrative openings 9a, 9b are shown in phantom.

Figure 5:
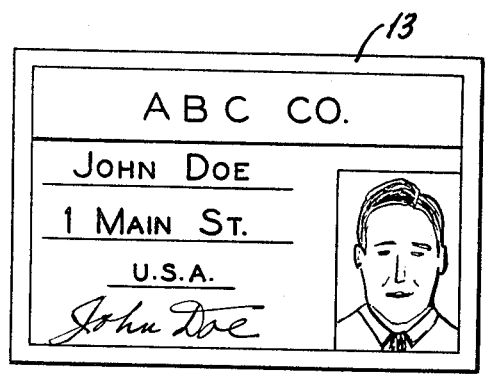
FIG. 5 is an identification card made according to the present invention.

FIG. 5 shows a completed identity card 13 which is a unitary photo reproduction of the head 2 and the signed card 5.

In use an identity card 5 is filled out and usually signed, then placed into an appropriate position for being photographed. The head of the subject or object to be superimposed is positioned to be sighted on the film 3 at a desired position either by use of reflectors 8, 8a, 8b or by positioning the reflector 8 and head 2 so that it is properly aimed.

The reflector 8 may be solid with openings or may be a mirror with a transparent portion at a desired position.

By selecting light values by means known in the art and lenses 14 with depth of focus sufficient to leave the head 2 and card 5 both in focus after a selected exposure with the shutter 4 of a unitary picture is the resultant card 13 showing a photo reproduction of the information, signature if desired, and of the head 2.

By means of the present system a relatively small device may be provided adaptable for superimposition at any point of the picture card 13. Of course the invention is also applicable with bank check endorsement security devices such as used in stores, drivers' licenses and other uses.

It should also be noted that it does not matter whether the card and mirror arrangement are inside or outside the body of the camera or superimposing photographic device.

The terms and expressions which are employed are used as terms of description, it is recognized, though, that various modifications are possible within the scope of the invention claimed.

Having thus described certain forms of the invention in some detail, what is claimed is:

1. A photographic device adapted to superimpose non-overlapping images on a single photosensitive surface for simultaneous photographing comprising a reflecting surface adapted to reflect an object on said photosensitive surface, the opposite surface of said reflecting surface being opaque, and said reflecting surface having a transparent area having a pre-selected position adapted to allow light from another differently positioned element to reach said photosensitive surface, lens means interposed between said reflecting surface and said photosensitive surface and means adapted to control a selected exposure of said photosensitive surface.

2. A photographic device adapted to superimpose non-overlapping images on a single photosensitive surface for simultaneous photographing comprising a first reflecting surface adapted to reflect an object onto a second reflecting surface, a second reflecting surface adapted to reflect said reflected object onto said photosensitive surface, the opposite surface of said reflective surface being opaque, said second reflecting surface having a transparent area in a preselected position adapted to allow light from another differently positioned element to reach said photosensitive surface, lens means interposed between said reflecting surface and said photosensitive surface and means adapted to control a selected exposure of said photosensitive surface.

3. A photographic device adapted to superimpose non-overlapping images on a single photosensitive surface for simultaneous photographing comprising a mirror adapted to reflect an object onto another reflecting surface, the opposite surface of said reflecting surface being opaque, said other reflecting surface adapted to reflect said reflected object onto said photosensitive surface, said other reflecting surface having a transparent area in a preselected position thereon adapted to allow light from another differently positioned element to reach said photosensitive surface, lens means interposed between said reflecting surface and said photosensitive surface and means adapted to control a selected exposure of said photosensitive surface.

4. A photographic device adapted to superimpose non-overlapping images on a single photosensitive surface for simultaneous photographing comprising a first reflecting surface adapted to reflect an object onto a mirror, the opposite surface of said mirror being opaque, said mirror adapted to reflect said reflected object onto said photosensitive surface, said mirror having a transparent area in a pre-selected position thereon adapted to allow light from another differently positioned element to reach said photosensitive surface, lens means interposed between said reflecting surface and said photosensitive surface, and means adapted to control a selected exposure of said photosensitive surface.

5. A photographic device adapted to superimpose non-overlapping images on a single photosensitive surface for simultaneous photographing comprising a first reflecting surface adapted to reflect an object onto a prism, said prism adapted to reflect said reflected object onto said photosensitive surface, said prism having a hollow preselected area adapted to allow light from another differently positioned element to reach said photosensitive surface, lens means interposed between said reflecting surface and said photosensitive surface and means adapted to control a selected exposure of said photosensitive surface.

6. A photographic device having an unipositioned lens system adapted to superimpose non-overlapping images on a single photosensitive surface for simultaneous photographing comprising a first reflecting surface adapted to reflect an object onto a second reflecting surface, a second reflecting surface adapted to reflect said reflected object onto said photosensitive surface, the opposite side of said second reflecting surface being opaque, said second reflecting surface having a transparent area in a pre-selected position thereon adapted to allow light from another differently positioned element to reach said photosensitive surface, a lens interposed between said reflecting surface and said photosensitive surface, said reflected objects adapted to be focused by said lens, and means adapted to control a selected exposure of said photosensitive surface.

References Cited

UNITED STATES PATENTS

| | | | |
|---|---|---|---|
| 2,210,090 | 8/1940 | Lutz | 95—1.1 |
| 2,896,522 | 7/1959 | Stein | 95—1.1 |
| 3,044,344 | 7/1962 | Hartmeister | 88—24 |
| 3,111,887 | 11/1963 | Alexander | 95—1.1 |

JOHN M. HORAN, *Primary Examiner.*